UNITED STATES PATENT OFFICE.

KARL SCHIRMACHER AND HEINRICH ELVERT, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

BROWN AZO DYESTUFFS.

1,077,492.     Specification of Letters Patent.     Patented Nov. 4, 1913.

No Drawing.     Application filed January 2, 1913. Serial No. 739,882.

*To all whom it may concern:*

Be it known that we, KARL SCHIRMACHER, Ph. D., chemist, and HEINRICH ELVERT, Ph. D., chemist, citizens of the Empire of Germany, residing at Höchst-on-the-Main, Germany, have invented certain new and useful Improvements in New Brown Azo Dyestuffs, of which the following is a specification.

We have found that valuable brown azo dyestuffs are obtained by combining a diazo compound of a p-amino-diaryl-sulfoxid with naphthalene-2-arylamino-8-oxy-6-sulfonic acid. The dyestuffs thus produced are brown powders, soluble in water to a brown solution, almost insoluble in ether, benzene and alcohol, and which dye wool brown tints of excellent fastness to washing. The constitution of said dyestuffs corresponds to the formula:

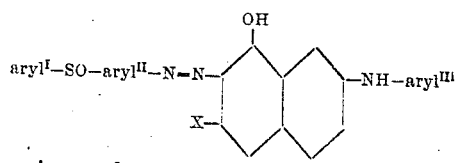

wherein aryl$^I$, aryl$^{II}$ and aryl$^{III}$ mean aromatic residues and X means a sulfo group.

By treating these dyestuffs with tin and hydrochloric acid they may, in the first instance, be split up into naphthalene-2-aryl-amino-7-amino-8-oxy-6-sulfonic acid and into p-aminodiarylsulfoxids, the latter being eventually further reduced to para-amino-diaryl-sulfids.

The following example illustrates the invention, the parts being by weight: 22.9 parts of tolyl-para-aminophenylsulfoxid, obtained by condensing para-toluenesulfonic acid with anilin, are diazotized with 60 parts of hydrochloric acid of 20° Bé. specific gravity and 7 parts of sodium nitrite, and the diazo solution, after it has been filtered, is introduced, while stirring, into a solution of 35 parts of naphthalene-2-phenyl-amino-8-oxy-6-sulfonic acid and 70 parts of calcined sodium carbonate. After the mixture has been stirred for several hours it is heated to 50–70° C., whereupon a small quantity of common salt is added and the coloring matter separated by filtration. The dyestuff thus obtained has the formula

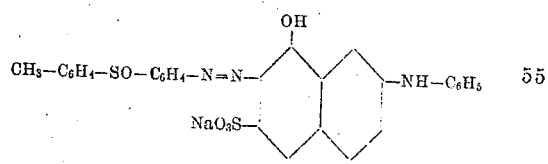

It forms, when dry, a deep-brownish-black powder, dissolving in concentrated sulfuric acid to a red solution. It dissolves to a brown solution in hot water, wherein it is more readily soluble than in cold water, and dyes wool fast brown tints.

Having now described our invention, what we claim is:

1. As new products, the azo-dyestuffs of the constitution:

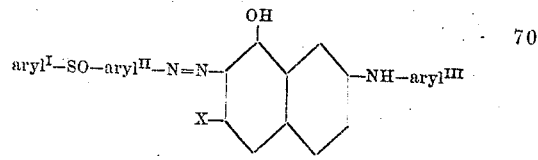

wherein aryl$^I$, aryl$^{II}$ and aryl$^{III}$ mean aromatic residues and X means a sulfo group, being brown powders, soluble in water to a brown solution, almost insoluble in ether, benzene and alcohol, and dyeing wool fast brown tints.

2. As a new product, the azo-dyestuff of the constitution:

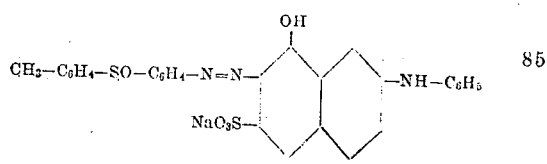

being a brown powder, soluble in water to a brown solution, almost insoluble in ether, benzene and alcohol, and dyeing wool fast brown tints.

In testimony whereof, we affix our signatures in presence of two witnesses.

KARL SCHIRMACHER.
    HEINRICH ELVERT.

Witnesses:
  JEAN GRUND,
  CARL GRUND.

Copies of this patent may be obtained for five cents each, by addressing the "Commissioner of Patents, Washington, D. C."